(12) United States Patent
Kwok et al.

(10) Patent No.: US 11,917,471 B2
(45) Date of Patent: *Feb. 27, 2024

(54) DYNAMICALLY CHANGING THE PRIMARY CELL (PCELL) FOR FIFTH GENERATION (5G) CARRIER AGGREGATION

(71) Applicant: T-Mobile USA, Inc., Bellevue, WA (US)

(72) Inventors: Ming Shan Kwok, Seattle, WA (US); Yasmin Karimli, Kirkland, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,444

(22) Filed: Feb. 27, 2023

(65) Prior Publication Data

US 2023/0224776 A1 Jul. 13, 2023

Related U.S. Application Data

(63) Continuation of application No. 17/143,962, filed on Jan. 7, 2021, now Pat. No. 11,622,306.

(51) Int. Cl.
*H04W 36/00* (2009.01)
*H04W 36/22* (2009.01)

(52) U.S. Cl.
CPC . *H04W 36/0094* (2013.01); *H04W 36/00835* (2018.08); *H04W 36/00837* (2018.08); *H04W 36/22* (2013.01)

(58) Field of Classification Search
None
See application file for complete search history.

(56) References Cited

U.S. PATENT DOCUMENTS

| 9,014,141 B2 | 4/2015 | Kim |
| 2018/0027562 A1 | 1/2018 | Jeon |

(Continued)

FOREIGN PATENT DOCUMENTS

WO WO2020164177 A1 8/2020

OTHER PUBLICATIONS

Anritsu, "Understanding Carrier Aggregation", available at <<http://vertassets.blob.core.windows.net/download/a8782958/a8782958-3c88-44d2-9204-f6e37a862025/understanding_carrier_aggregation_white_paper_june_2015.pdf>>, Mar. 15, 2015, 43 pages.

(Continued)

*Primary Examiner* — Suhail Khan
(74) *Attorney, Agent, or Firm* — Lee & Hayes P.C.

(57) ABSTRACT

A telecommunication network associated with a wireless telecommunication provider can be configured to dynamically switch the primary cell (PCell) used by user equipment (UE) for carrier aggregation (CA) in 5G cellular networks. Instead of remaining anchored to an initially selected PCell, a different PCell may be dynamically selected based on different network conditions. The network conditions may include network congestion, network capacity, uplink speed, location of the UE, an activity of the UE (e.g., is the UE uploading or planning to upload data), and the like. As an example, the PCell may be selected from an n41 (2.5 GHz) cell and an n71 (600 MHz) cell. When the UE is close to the n41 cell, the n41 cell may be selected. When the UE is moving away from the cell center and toward the cell edge, the PCell may be switched from the n41 cell to the n71 cell.

20 Claims, 5 Drawing Sheets

(56) References Cited

U.S. PATENT DOCUMENTS

2019/0230568 A1\* 7/2019 Arur ............... H04B 7/2041
2020/0351645 A1 11/2020 Jin et al.
2022/0217595 A1 7/2022 Kwok et al.

OTHER PUBLICATIONS

Extended European Search Report dated May 30, 2022 for European Patent Application No. 22150493.9, 9 pages.
Hedlund et al., "An Introduction to Carrier Aggregation Testing", available at <<https://www.infovista.com/sites/default/files/resources/2018-09/wp-introduction-to-carrier-aggregation-testing_0.pdf>>, 2017, 30 pages.
Office Action for U.S. Appl. No. 17/143,962, dated Aug. 31, 2022, Ming Shan Kwok, "Dynamically Changing the Primary Cell (PCell) for Fifth Generation (5G) Carrier Aggregation", 8 pages.
Office Action for U.S. Appl. No. 17/143,962, dated Apr. 27, 2022, Kwok, "Dynamically Changing the Primary Cell (PCell) for Fifth Generation (5G) Carrier Aggregation", 8 Pages.
Wannstrom, Jeanette, "Carrier Aggregation explained", available at <<https://www.3gpp.org/technologies/keywords-acronyms/101-carrier-aggregation-explained>>, Jun. 2013, 6 pages.

\* cited by examiner

DYNAMICALLY CHANGING THE PRIMARY CELL (PCELL) FOR FIFTH GENERATION (5G) CARRIER AGGREGATION

CROSS-REFERENCE TO RELATED APPLICATIONS

This application is a continuation of and claims priority to U.S. application Ser. No. 17/143,962, filed Jan. 7, 2021, which is incorporated by reference herein in its entirety.

BACKGROUND

Modern terrestrial telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, and Evolved High-Speed Packet Access (HSPA+) are examples of 4G telecommunications technologies. Moving forward, telecommunications systems include fifth generation (5G) cellular-wireless access technologies to provide improved bandwidth and decreased response times to a multitude of devices that may be connected to a network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
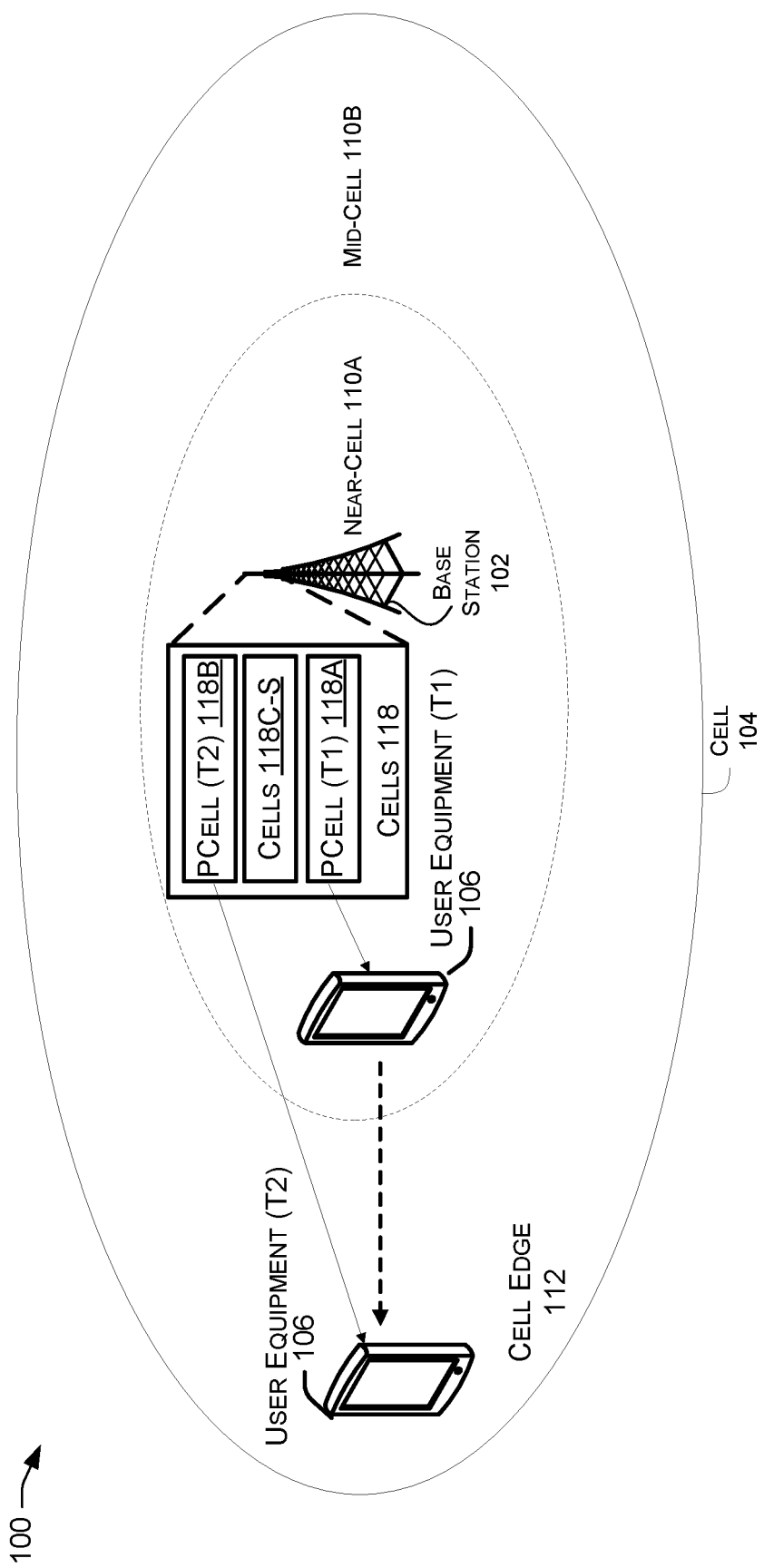
FIG. 1 is a block diagram of an illustrative environment showing dynamically switching from one primary cell (PCell) used by a user equipment (UE) for carrier aggregation (CA) to another PCell.

Described herein are techniques and systems relating to dynamically changing a 5G primary cell (PCell) used by a user equipment (UE) during carrier aggregation (CA). The term "carrier aggregation" refers to using carriers in multiple frequency channels to receive or transmit data simultaneously from a single UE. By aggregating the channels, the total data throughput to or from the UE can be increased. CA can be used for both Time-division duplexing (TDD) and Frequency-division duplexing (FDD). CA can also be used for both licensed and unlicensed spectrum. The term "primary cell" refers to the serving cell for the UE. Other cells that are not used as the PCell may be referred to herein as secondary cells (SCells). The PCell is the cell that the UE exchanges radio resource control (RRC) signaling messages with. The PCell remains in the RRC_CONNECTED mode while one or more SCells may be active.

Using techniques described herein, a UE is not limited to using the initially selected primary cell for CA. Instead of remaining anchored to the initially selected PCell, a different PCell may be dynamically selected based on network conditions of the cellular network and/or other factors. The network conditions and/or other factors may include but are not limited to network congestion, network capacity, uplink speed, location of the UE, an activity of the UE (e.g., is the UE uploading or planning to upload data), and the like. Generally, the PCell used by the UE 106 may be changed in an attempt to increase the user experience for the user of the UE.

For example, a UE can be configured to use a first cell as the PCell for CA when the UE is in a first cell condition (e.g., near-cell, mid-cell) and then switch to a different PCell when the UE moves away from the PCell and is closer to the cell edge. According to some examples, network conditions associated with the cellular network (e.g., RF conditions) are monitored and analyzed by the UE, and/or some other node or component within the cellular network (e.g., gNB) to determine when to switch the PCell being used. In this way, user experience will be improved as the UE is more efficiently using the available radio access technologies.

In some configurations, the PCell may be selected from many different cells. In some examples, the PCell may be selected from available high bandwidth cells (e.g., an n41 (2.5 GHz) cell) and lower bandwidth cells (e.g., an n71 (600 MHz) cell) for 5G carrier aggregation (CA). The PCell to use may be selected based on current/forecasted network conditions and/or other factors. For instance, when the UE is near the high bandwidth cell, the high bandwidth cell may be selected as the PCell as the user experience may be better as compared to using the lower bandwidth cell. If the UE is moving away from the cell center and toward the cell edge, the PCell may be switched from the high bandwidth cell to the lower bandwidth cell in some examples. In this way, the user experience is enhanced. Generally, the UE and/or some other node, may monitor/forecast network conditions to determine when to switch the PCell for a UE. By switching the PCell, poor performance of the UE (e.g., when the UE is near/on the cell edge) can be avoided. The systems, devices, and techniques described herein can improve a functioning of a network by providing an architecture to switch the PCell used by the UE for CA based on one or more network conditions. For example, switching from/to a cell for use as a PCell may result in better performance for the UE. These and other improvements to the functioning of a computer and network are discussed herein. More details are provided below with reference to FIGS. 1-5.

FIG. 1 is a block diagram of an illustrative environment 100 showing dynamically switching from one primary cell (PCell) used by a user equipment (UE) for carrier aggregation (CA) to another PCell. In the network environment 100, a base station 102 can communicate with any of a variety of devices in a cell 104, such as a user equipment (UE) 106.

In various examples, the base station 102 may include at least one device configured to schedule wireless resources for uplink and downlink communications within the cell 104. The base station 102 may further include at least one device configured to transmit communications over the wireless resources to devices located in the cell 104 (e.g., the UE 106), and to receive communications over the wireless resources from the devices located in the cell 104.

Figure 2:
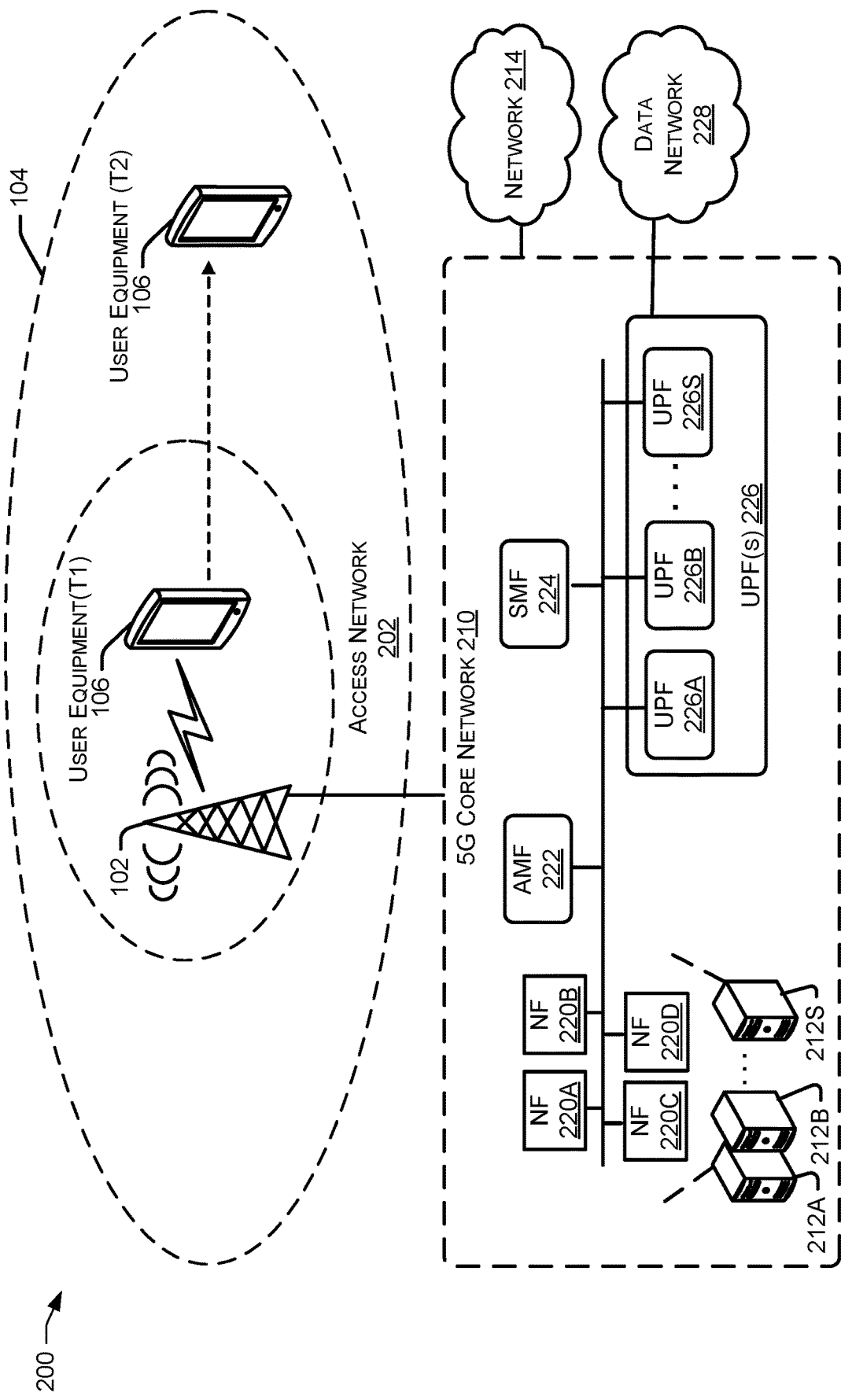
FIG. 2 is a block diagram of an illustrative environment including a 5G core network showing switching the PCell used for CA.

Although not illustrated in FIG. 1, in some instances, the base station 102 may relay communications between an external network (e.g., a core network as illustrated in FIG. 2) and the devices located in the cell 104. A core network, for example, can provide services to device(s) via the base station 102 from a wide area network (WAN), such as the Internet. In some instances, the core network includes an IP Multimedia Subsystem (IMS) core (sometimes referred to as an "IMS core network," an "IMS network," or an "IM CN Subsystem").

In some instances, the base station 102 can utilize wireless resources specified in the 5G New Radio (NR) standard, as defined by 3GPP. In certain implementations, the base station 102 can transmit and receive communications over frequency bands including, but not limited frequency ranges associated with Long Term Evolution (LTE), 5G networks (e.g., frequency range 1 (FR1) that ranges from 450 MHz to 6 GHz, and frequency range 2 (FR2) that ranges from 24.25 GHz to 52.6 GHz), as well as other frequency ranges, In some embodiments, the base station 102 can be, or at least include, a gNodeB (gNB).

In addition, the base station 102 may utilize other types of wireless resources. For example, the base station 102 may utilize a wireless band including frequency resources in at least one of a Citizens Broadband Radio Service (CBRS) band (e.g., a 3550-3700 MHz band), a Long Term Evolution (LTE) Band 71 (e.g., a 600 MHz band), an LTE Band 48 (e.g., 3500 MHz), and the like. In some instances, the frequency resources can include, but are not limited to, LTE Band 1 (e.g., 2100 MHz), LTE Band 2 (1900 MHz), LTE Band 3 (1800 MHz), LTE Band 4 (1700 MHz), LTE Band 5 (850 MHz), LTE Band 7 (2600 MHz), LTE Band 8 (900 MHz), LTE Band 20 (800 MHz GHz), LTE Band 28 (700 MHz), LTE Band 38 (2600 MHz), LTE Band 41 (2500 MHz), LTE Band 50 (1500 MHz), LTE Band 51 (1500 MHz), LTE Band 66 (1700 MHz), LTE Band 70 (2000 MHz), and LTE Band 74 (1500 MHz). Although referred to in the context of LTE bands, it can be understood that the base station may utilize the frequency resources discussed herein in the context of any 5G embodiments, such as n71.

In some embodiments, the base station 102 is part of a Non-Standalone (NSA) architecture and/or a Standalone (SA) architecture. In an NSA architecture, the base station 102 may be coordinated with an LTE base station, and/or may relay services between devices in the cell 104 and an LTE core network (e.g., an Evolved Packet Core (EPC)). In an SA architecture, the base station 102 may relay services between devices in the cell 104 and a 5G core network (5GC).

The cell 104 may be a geographic region in which the base station 102 can transmit and/or receive wireless communications. The cell 104 may be divided into at least two regions, which are defined according to a distance from the base station 102, a quality of wireless communications with the base station 102, sources of attenuation in the cell 104, etc. For example, the cell 104 may include a near-cell region 110A, a mid-cell region, 110B, and a cell edge region 112. In some instances, the near-cell region 110A is less than a threshold distance from the base station 102 and is a region where wireless communication with the base station 102 is relatively strong. The mid-cell region 110B is equal to or larger than the threshold distance In certain instances, the cell edge region 112 is more than a threshold distance from the base station 102 and is a region where wireless communication with the base station 102 and has an outer boundary that is defined by the cell edge 112 outer boundary of the cell 104. In some instances, the mid-cell region 110B is a region where wireless communication with the base station 102 is weaker than in the near-cell region 110A.

The base station 102 may determine whether devices are located in the near-cell region 110A, the mid-cell region 110B, or past the cell edge region 112 based on a quality and/or power of transmissions between the base station 102 and the devices. For instance, the base station 102 may determine that the UE 106 is located in the near-cell region 110A by receiving a signal from the UE 106 and determining that a quality or power of the received signal is greater than a particular threshold. The base station 102 may determine that a UE 106 is located in the mid-cell region 110A by receiving a signal from the UE 106 and determining that a quality or power of the received signal is less than or equal to the particular threshold.

The UE 106 is configured to transmit and/or receive wireless communications with the base station 102 and may be located in the cell 104. The UE 106 may be capable of supporting NR communications. For example, the UE 106 may be configured to support at least one of enhanced Mobile Broadband (eMBB) communications, Ultra Reliable Low Latency Communications (URLLCs), or massive Machine Type Communications (mMTCs). In some instances, the UE 106 and/or the second UE 106 support one or more of a sensor network, voice services, smart city cameras, gigabytes-in-a-second communications, 3D video, 4K screens, work & play in the cloud, augmented reality, industrial and/or vehicular automation, mission critical broadband, or a self-driving car.

The UE 106 may be capable of transmitting/receiving data wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), NR, Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future IP-based network technology or evolution of an existing IP-based network technology. Examples of the UE 108 can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data over a network. Additional examples of the UE 106 include, but are not limited to, smart devices such as televisions, refrigerators, washing machines, dryers, smart mirrors, coffee machines, lights, lamps, temperature sensors, leak sensors, water sensors, electricity meters, parking sensors, music players, headphones, or any other electronic appliances that can generate, request, receive, transmit, or exchange voice, video, and/or digital data over a wireless network.

The base station 102 may be configured to transmit first downlink data to the UE 106. As used herein, the term "downlink," and its equivalents, refers to a transmission direction defined from a base station to an end-user device. As used herein, the term "uplink," and its equivalents, refers to a transmission defined from the end-user device to the base station. The base station 102 may utilize multiple channels for downlink transmissions within the cell 104. As used herein, the terms "channel," "frequency channel," "frequency resource," "carrier frequency," or their equivalents, may refer to a distinct range of electromagnetic frequencies or spectrum by which data can be transmitted wirelessly from one device to at least one other device. A "band" may refer to a range of frequencies including multiple channels that are adjacent in the frequency spectrum. In some examples, a frequency channel is defined according to a single frequency. For instance, the data is transmitted by modulating a "carrier," which is an electromagnetic wave that has a frequency defined within a particular frequency channel. The base station 102 may utilize various channels in the radio spectrum. In particular, the base station 102 may be allocated, or otherwise utilize, multiple channels for downlink transmission within the cell 104.

In various implementations, the base station 102 may use CA to transmit data to a UE within the cell. For example, a cell from the cells 118 may be selected to service as a PCell for the UE 106. In the example of FIG. 1, a primary cell (PCell) may be selected from cells 118. In some cases, the PCell 118 used by the UE 106 may be selected based on network conditions, the location of the UE 106 within the cell 104, and/or other factors may be used to select the PCell 118 to use by the UE 106 for CA. The distance between the base station 102 and the first UE 106 may impact the reliability of data transmitted over different channels. For example, higher-frequency signals are attenuated by the air and obstructions to a greater extent than lower-frequency signals, such as signals transmitted over LTE bands. In some configurations, when the UE 106 is within the near-cell region 110, the PCell 118A that operates at a higher frequency compared to PCell 118B may be chosen as the PCell. In some examples, the base station 102 may determine that the UE 106 is in the mid/near-cell region 110 based on a quality of signal received by the base station 102 from the UE 106.

According to various examples, the PCell to be used by the UE 106 for CA may be selected based on network conditions. For example, the base station 102, the UE 106, or some other device/component may determine current/forecasted congestion levels of the channels available for downlink transmission. As used herein, the terms "congestion level," "utilization level," and their equivalents, can refer to an amount of a wireless resource being used to transfer data between devices. For example, the congestion level of a wireless channel can refer to an amount (e.g., a percentage) of scheduled slots within the wireless channel. In various cases, the PCell 118 may be changed based on changing conditions of the UE 106 and/or network. For instance, if the congestion level of the frequency range associated with the PCell exceeds a threshold or is predicted to exceed the threshold.

In the example illustrated by FIG. 1, the UE 106 uses PCell 118A at time T1 when the UE 106 is considered to be in a near-cell 110A condition and then is dynamically switched to PCell 118B at time T2 when the UE 106 moves away from the near-cell 110A condition and is near the cell edge 112. In some examples, the UE 106 may continue to use PCell 118A even when it moves away from the near-cell 110A condition. For instance, the congestion level for the channels used by PCell 118B may be congested or forecasted to be congested.

In some examples, artificial intelligence (AI) may be used in determining when to dynamically change the PCell. For instance, the base station 102 may use a computing model to predict conditions of the network and select the PCell 118 based on the predicted conditions. The base station 102 may store congestion levels of various channels within the spectrum over time. The base station 102 may use a computing model, such as a machine learning model, to identify trends in the congestion levels. As used herein, the term "machine learning model" can refer to any computing model that is built or otherwise optimized based on training data. The machine learning model, for example, may be configured to identify features that are indicative of data traffic and/or spectrum trends based on training data indicating previous data traffic metrics associated with the base station 102. The machine learning model may be supervised, unsupervised, or a combination of both. Examples of the machine learning model include at least one of a decision tree, a support vector machine, a regression model (e.g., a logistic regression model), a Bayesian network, or any other type of machine learning model known in the art. Once trained, the machine learning model may be configured to intelligently select a PCell 118 for the UE 106.

In a particular example, the base station 102 may identify, by training a machine learning model, that one or more times of the day are regularly associated with high congestion levels in the spectrum used by the base station 102. For instance, the time(s) may be correlated with when a large number of users is within range of the base station 102. Using the machine learning model, the base station 102 may predict that congestion levels will temporarily increase at one or more times of the day. In some cases, the base station 102 may attempt to select a higher bandwidth cell to use as the PCell when congestion is expected on the lower bandwidth cells.

FIG. 2 is a block diagram of an illustrative environment including a 5G core network showing switching the PCell used for CA. The environment 200 may include an access network 202, a 5G core network 210, a network 214, and a data network 228 that is associated with a wireless service provider(s). The environment 200 is illustrated in simplified form and may include many more components.

The environment 200 may include one or more base stations 102 that may be wireless or wired that are coupled to 5G core network 110 and/or some other network. The environment 100 may also include one or more access points (not shown), and one or more gateways (not shown). A base station 102 may handle traffic and signals between electronic devices, such as the user equipment 106, and 5G CN 210. For example, a base station 102 may perform the transcoding of speech channels, allocation of radio channels to electronic devices, paging, transmission and reception of voice and data, as well as other functions. While one base station is illustrated, more than one base station 102 may be included within cell 104. Each base station 102 may include a transceiver, antenna, and additional network switch and control equipment that provide a network cell for facilitating wireless communication between UE computing devices and the core network 210 and/or other networks.

The UE 106 are computing devices that can include, but are not limited to, smart phones, mobile phones, cell phones, tablet computers, portable computers, laptop computers, personal digital assistants (PDAs), electronic book devices, or any other portable electronic devices that can generate, request, receive, transmit, or exchange voice, video, and/or digital data using a cellular access network 202, and/or over a Wi-Fi network, or some other type of network. In some instances, the UE 106 computing devices can be configured to send and receive data using any wired or wireless protocols. Additional examples of the UE 106 include, but are not limited to, smart devices such as televisions, music players, or any other electronic appliances that can generate, request, receive, transmit, or exchange voice, video, and/or digital data over a network. In some examples, the UE 106 is configured to communicate with 5G CN 210, and/or other cellular networks. The UE 106 can further be configured to establish or receive a communication session, such as a voice call, a video call, or another sort of communication.

In some configurations, one or more nodes, such as nodes 212 illustrated in 5G CN 210 and/or nodes 216 illustrated in network 214 may be configured as one or more application servers that provide support for one more applications, such as application 207 used by one or more computing devices, such as UE 106. Some example applications include, but are not limited to browser applications, messaging applications, voice applications (e.g., Voice over Internet Protocol "VoIP" applications), video applications, and the like.

While the nodes 212 are illustrated within the 5G CN 210 and nodes 216 are illustrated in network 214, one or more other computing devices may be located outside of these networks. For example, an application server, or some other server or device, may be connected to a network via one or more external packet switched networks, such as the Internet.

According to some configurations, a telephony client application on the UE 106 may establish data communication with the network 210 through a data connection to the base station 102. The base station 102 may route a communication wired/wirelessly from the UE 106 through the access network 202 for communication to the 5G CN 210. In general, a base station 102 can be implemented as a variety of technologies to provide wired and/or wireless access to the network, as discussed herein. In some instances, the base station 102 can include a New Radio (5G) RAN, a 3GPP RAN, such a GSM/EDGE RAN (GERAN), a Universal Terrestrial RAN (UTRAN), an evolved UTRAN (E-UTRAN), or alternatively, a "non-3GPP" RAN, such as a Wi-Fi RAN, or another type of wireless local area network (WLAN) that is based on the IEEE 802.11 standards. Further, the base station 102 can include any number and type of transceivers and/or base stations representing any number and type of macrocells, microcells, picocells, or femtocells, for example, with any type or amount of overlapping coverage or mutually exclusive coverage.

When a communication request arrives at the network 210, one or more of the nodes 212 may determine the identity of the originating computing device for the communication (e.g., using a telephone number, IMEI, IMSI, IP address) as well as the identity of the computing devices to send the communication. In some configurations, one or more of the nodes 216 may be used to determine the identity of the originating computing device for the communication as well as the identity of the computing devices to send the communication. According to some configurations, a UE 106 may connect to the service nodes 212, or some other component such as an application server, via the Internet (not illustrated).

As illustrated, the environment 200 includes one or more servers, including nodes 212, to facilitate communications by and between the various devices in the environment 200 and perform operations relating to using the network 214, the data network 228, and/or other networks. That is, environment 200 can include any computing devices implementing various aspects of one or more of second, third, fourth generation, and fifth generation (2G, 3G, 4G, and 5G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long-Term Evolution (LTE), including LTE Advanced, Evolved High-Speed Packet Access (HSPA+) are examples of 4G, and 5G NR is an example of 5G telecommunications technologies. Thus, the environment 200 may implement GSM, UMTS, LTE/LTE Advanced, and/or 5G NR telecommunications technologies.

The environment 200 may include, but is not limited to, a combination of: base transceiver stations BTSs (e.g., NodeBs, Enhanced-NodeBs, gNodeBs), Radio network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the UE 106, and one or more endpoints within the environment 200 (e.g., nodes 212A-212S that provide network functions (NFs) 220A-220D, Access and Mobility Management Function (AMF) 222, Session Management Function (SMF) 224, user-plane functions (UPFs) 226, nodes 216A-216Q that provide NFs 220E-220I, websites, etc.). While FIG. 2 illustrates an example environment 200, it is understood in the context of this document, that the techniques discussed herein may also be implemented in other networking technologies.

The 5G core network 210 may expose network Functions (NFs) to nodes within the network 210, and/or nodes within some other network, such as network 214 and/or network 228. As illustrated, the 5G CN exposes NFs 220A-220D, AMF 222, SMF 224, and UPFs 226.

In some examples, the UE 106 requests a new session that is received by an AMF 222. The AMF 222 receives the request from the UE 106 and handles connection or mobility management requests while forwarding session management requirements to the SMF 224. The AMF 222 may determine which SMF 224 to use by querying a Network Repository Function (NRF), such as NRF 222 illustrated in FIG. 2. According to some configurations, the SMF 224 may access and/or store data that identifies the connected cell-IDs associated with UEs and the corresponding connected UPFs.

As briefly discussed above, using techniques described herein, a UE 106 is not limited to using an initially selected PCell 118 for CA in a 5G cellular network. For example, a UE 106 can be configured to use a first PCell associated with a first frequency range during CA during a first time, and switch to a second PCell associated with a second frequency range when the UE 106 at a second time.

As an example, a UE 106 can be initially configured to use a first PCell at registration and/or upon completion of a hand-over procedure. After the initial configuration, the base station 102, or some other device or component can monitor/forecast network conditions and determine when to switch the UE 106 from/to the PCell.

While the UE 106 is connected to a base station 102, the base station 102 may be receiving various types of data that is relevant in determining which communication PCell is currently optimal to be used by the UE 106 for CA. For example, the UE 106 may generate performance metrics associated with a current state of service being provided by the network operator and/or signal qualities associated with the base station 102 and/or one or more other base stations. As a more specific, but non-limiting example, the performance metrics may indicate that a signal strength of the current PCell is relatively weak at the UE 106 and that signals are also available from other cells 118 that may serve as the PCell for the UE 106. The metrics may include standard Received Signal Received Power (RSRP) measurements that are generated for use in base station selection, reselection, and handover triggering. In various embodiments, the performance metrics may also discretely indicate with respect to one or more base stations a Signal-to-Noise Ratio (SNR), a Signal-to-Interference Plus Noise Ratio (SINR), a Signal-to-Noise Plus Distortion Ratio (SNDR), or any combination thereof. In some examples, the UE 106 may calculate a channel quality indicator (CQI) for inclusion within the metrics. For example, a CQI may be calculated using any relevant factors such as, for example, RSRP, SNR, SINR, SNDR, or any combination thereof.

In addition to receiving metrics from the UE 106, the base station 102 and/or some other device or component, may also be receiving/accessing/generating other data such as current capacity data associated with an available capacity of various base stations.

Upon receiving the metrics and/or other data, the base station 102 and/or some other device or component may determine in real-time or substantially real-time a PCell 118 to use for CA by the UE 106. For example, while metrics are being received from the UE 106, the base station 102 may determine that a switch from the currently selected PCell will increase performance. Accordingly, the base station 102 may cause the PCell to be switched to a different PCell.

In some embodiments, the determination of which PCell to use may be based on a current demand for data from the UE 106. For example, a user of the UE 106 may need access to streaming video content while at work. Accordingly, during the user's word day, the data demand from the UE 106 may increase sharply as the user begins to stream video content. Therefore, the increased demand for data may factor into what PCell to select.

Figure 3:
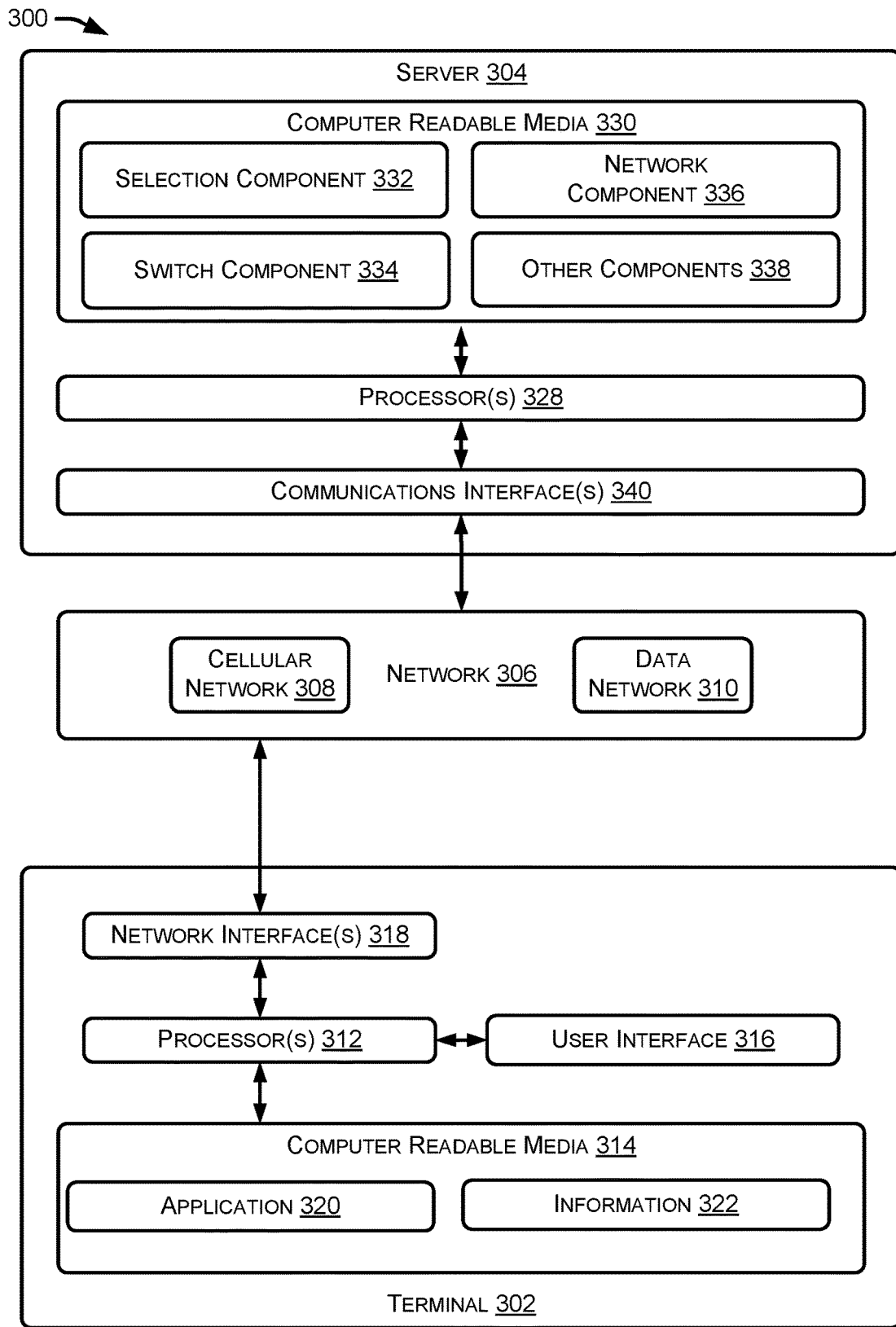
FIG. 3 is a block diagram illustrating a system that includes one or more components for dynamically switching the PCell used for CA.

FIG. 3 is a block diagram illustrating a system 300 that includes one or more components for dynamically switching the PCell used for CA. The system 300 includes a terminal 302, which can represent a UE 106, or another computing device, coupled to a server 304, via a network 306. The server 304 can represent a computing device, such as one or more of the servers within the access network 202, the 5G CN 210, network 214, and/or some other computing device. The network 306 can represent network 210, 214, 228 and/or access network 202, or some other network.

The network 306 can include one or more networks, such as a cellular network 308 and a data network 310. The network 306 can include one or more core network(s) connected to terminal(s) via one or more access network(s). Example access networks include LTE, WIFI, GSM Enhanced Data Rates for GSM Evolution (EDGE) Radio Access network (GERAN), UTRAN, and other cellular access networks. Message transmission, reception, fallback, and deduplication as described herein can be performed, e.g., via 3G, 4G, 5G, WIFI, or other networks.

The cellular network 308 can provide wide-area wireless coverage using a technology such as GSM, Code Division Multiple Access (CDMA), UMTS, LTE, NR, or the like. Example networks include Time Division Multiple Access (TDMA), Evolution-Data Optimized (EVDO), Advanced LTE (LTE+), Generic Access network (GAN), Unlicensed Mobile Access (UMA), Orthogonal Frequency Division Multiple Access (OFDM), GPRS, EDGE, Advanced Mobile Phone System (AMPS), High Speed Packet Access (HSPA), evolved HSPA (HSPA+), VoIP, VoLTE, IEEE 802.1x protocols, wireless microwave access (WIMAX), WIFI, and/or any future IP-based network technology or evolution of an existing IP-based network technology. Communications between the server 404 and terminals such as the terminal 302 can additionally or alternatively be performed using other technologies, such as wired (Plain Old Telephone Service, POTS, or PSTN lines), optical (e.g., Synchronous Optical NETwork, SONET) technologies, and the like.

The data network 310 can include various types of networks for transmitting and receiving data (e.g., data packets), including networks using technologies such as WIFI, IEEE 802.15.1 ("BLUETOOTH"), Asynchronous Transfer Mode (ATM), WIMAX, and other network technologies, e.g., configured to transport IP packets. In some examples, the server 304 includes or is communicatively connected with an IWF or other device bridging networks, e.g., LTE, 3G, and POTS networks. In some examples, the server 304 can bridge SS7 traffic from the PSTN into the network 306, e.g., permitting PSTN customers to place calls to cellular customers and vice versa.

In some examples, the cellular network 308 and the data network 310 can carry voice or data. For example, the data network 310 can carry voice traffic using VoIP or other technologies as well as data traffic, or the cellular network 308 can carry data packets using HSPA, LTE, or other technologies as well as voice traffic. Some cellular networks 308 carry both data and voice in a PS format. For example, many LTE networks carry voice traffic in data packets according to the VoLTE standard. Various examples herein provide origination and termination of, e.g., carrier-grade voice calls on, e.g., networks 306 using CS transports or mixed VoLTE/5G transports, or on terminals 302 including OEM handsets and non-OEM handsets.

The terminal 302 can be or include a wireless phone, a wired phone, a tablet computer, a laptop computer, a wristwatch, or other type of terminal. The terminal 302 can include one or more processors 312, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media (CRM) 314, such as memory (e.g., random access memory (RAM), solid state drives (SSDs), or the like), disk drives (e.g., platter-based hard drives), another type of computer-readable media, or any combination thereof. The CRM or other memory of terminal 302 can hold a datastore, e.g., an SQL or NoSQL database, a graph database, a BLOB, or another collection of data. The terminal 302 can further include a user interface (UI) 316, e.g., including an electronic display device, a speaker, a vibration unit, a touchscreen, or other devices for presenting information to a user and receiving commands from the user. The terminal 302 can further include one or more network interface(s) 318 configured to selectively communicate (wired or wirelessly) via the network 306, e.g., via an access network 102.

The CRM 314 can be used to store data and to store instructions that are executable by the processors 312 to perform various functions as described herein. The CRM 314 can store various types of instructions and data, such as an operating system, device drivers, etc. The processor-executable instructions can be executed by the processors 312 to perform the various functions described herein.

The CRM 314 can be or include computer-readable storage media. Computer-readable storage media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, non-transitory medium which can be used to store the desired information and which can be accessed by the processors 312. Tangible computer-readable media can include volatile and nonvolatile, removable and non-removable media implemented in any method or technology for storage of information, such as computer readable instructions, data structures, program components, or other data.

The CRM 314 can include processor-executable instructions of an application 320. The CRM 314 can store information 322 identifying the terminal 302. The information 322 can include, e.g., an IMEI, an IMSI identifying the subscriber using terminal 302, or other information discussed above. The CRM 314 can additionally or alternatively store credentials (omitted for brevity) used for access, e.g., to IMS or RCS services.

The server 304 can include one or more processors 328 and one or more CRM 330. The CRM 330 can be used to store processor-executable instructions of a selection component 432 which may be configured to dynamically select a cell 118 to serve as a PCell during CA based, at least in part, on one or more network conditions, a switch component 334 which may be configured to the switch to the selected PCell, a network component 336 that is configured to perform one or more network operations, as well as one or more other components 338. The processor-executable instructions can be executed by the one or more processors 328 to perform various functions described herein.

In some examples, server 304 can communicate with (e.g., is communicatively connectable with) terminal 302 or other devices via one or more communications interface(s) 340, e.g., network transceivers for wired or wireless networks, or memory interfaces. Example communications interface(s) 340 can include ETHERNET or FIBRE CHANNEL transceivers, WIFI radios, or DDR memory-bus controllers (e.g., for DMA transfers to a network card installed in a physical server 304).

In some examples, processor 312 and, if required, CRM 314, are referred to for brevity herein as a "control unit." For example, a control unit can include a CPU or DSP and instructions executable by that CPU or DSP to cause that CPU or DSP to perform functions described herein. Additionally, or alternatively, a control unit can include an ASIC, FPGA, or other logic device(s) wired (physically or via blown fuses or logic-cell configuration data) to perform functions described herein. Other examples of control units can include processor 328 and, if required, CRM 330.

Figure 4:
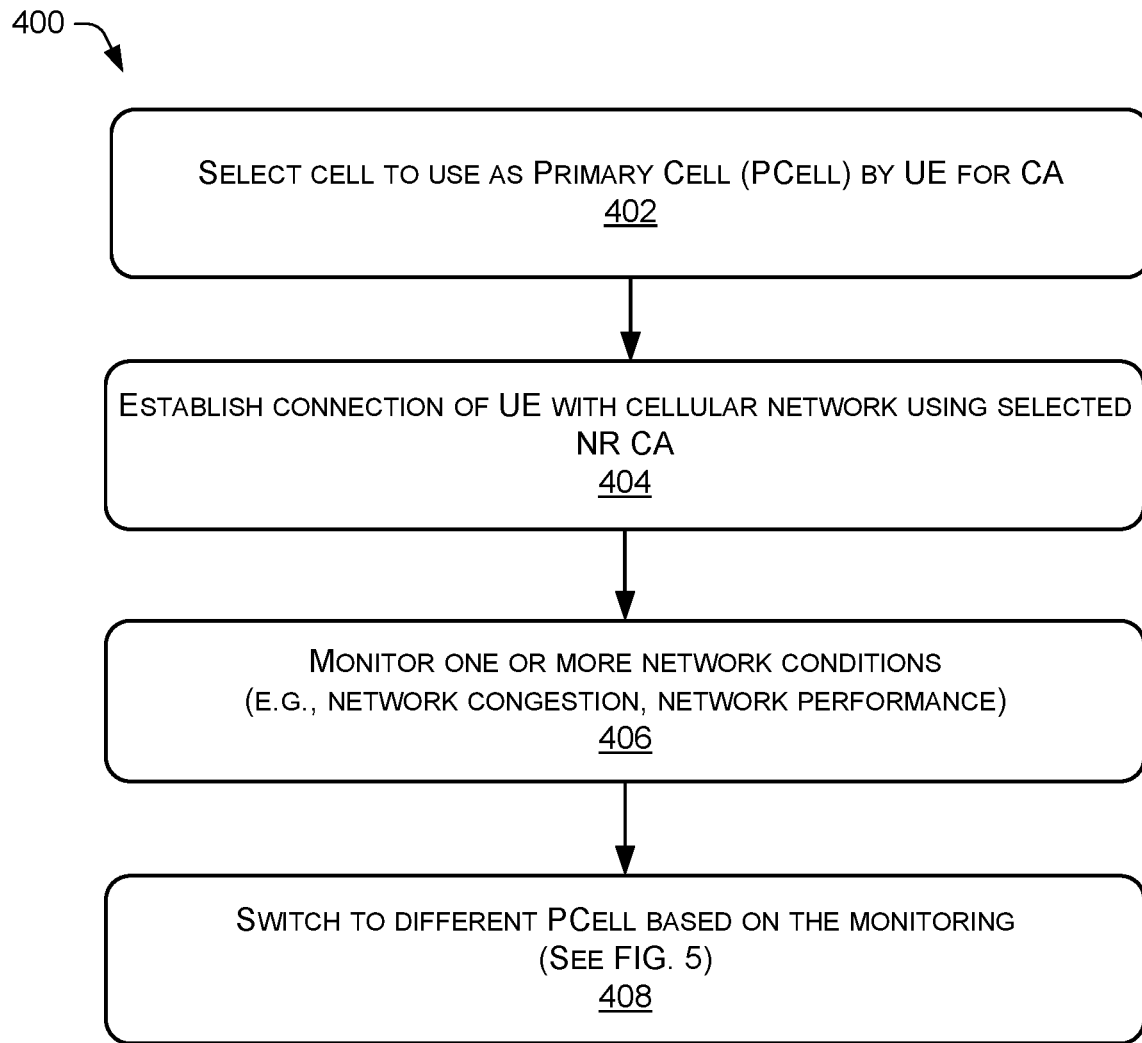
FIG. 4 is a flow diagram of an example process that includes dynamically switching the PCell used by a UE for CA in 5G cellular networks.
Figure 5:
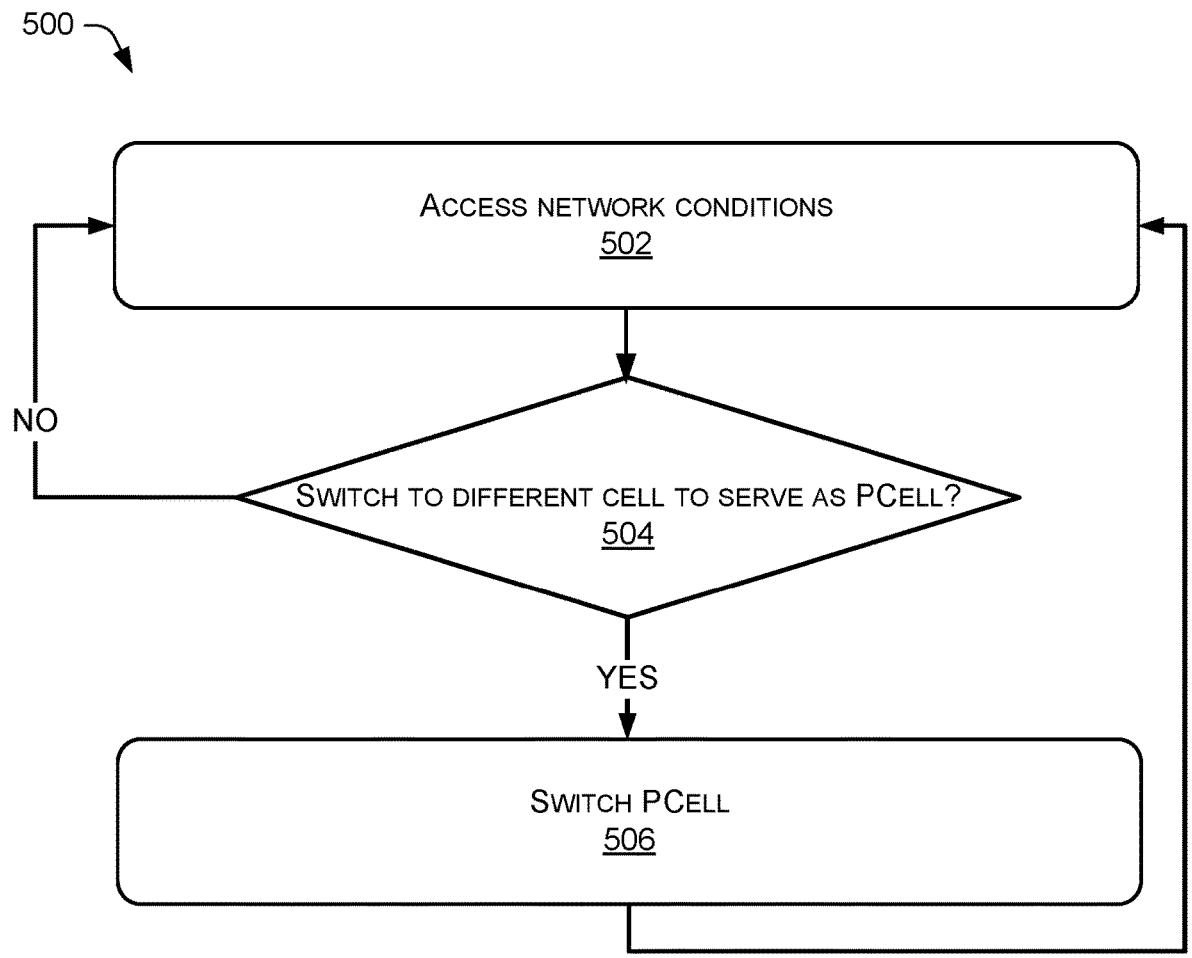
FIG. 5 is a flow diagram of an example process that includes determining when to switch the PCell used by a UE for CA based on network conditions.

FIGS. 4-5 illustrate example processes. The example processes are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 4 is a flow diagram of an example process that includes dynamically switching the PCell used by a UE for CA in 5G cellular networks. The process includes, at 402, initially selecting a cell 118 to use as a PCell by the UE 106 for CA during a communication session. As discussed above, the selection of the PCell may be selected based on current/forecasted network conditions, location of the UE 106, and the like.

At 404, a session using CA is established with the UE 106 using the selected PCell. As discussed above, using techniques described herein, the UE 106 may later switch to a different PCell (e.g., from n41 to n71, from n71 to n41, . . . ).

At 406, one or more network conditions are monitored. As discussed above, in some examples, the network conditions indicate whether the UE 106 is near cell, mid-cell, or near a cell edge. In some cases, the UE 106 monitors specified network conditions and can provide PHRs to one or more nodes, such as a connected gNB associated with cell 104. According to some configurations, other data may also be used to assist in determining what PCell to use. For example, the available bandwidth, current usage statistics, forecasted usage statistics, and/or some other data that may indicate capability of different cells 118 to provide service at a desired level to the UE 106.

At 408, the PCell can be switched from the current PCell 118 to a different PCell based on the network conditions. Generally, the PCell is switched when the network conditions indicate that the UE 106 will have better performance using the different PCell. See FIG. 5 and related discussion for more details.

FIG. 5 is a flow diagram of an example process that includes determining when to switch the PCell used by a UE for CA based on network conditions.

The process includes, at 502, accessing network conditions. As discussed above, in some configurations, the UE 106, a node such as a gNB, or some other device/component may access/generate data relating to network conditions. For example, the UE 106 may receive reports, such as PHRs, and provide data related to the network conditions to the PCell, and/or some other component or device, that includes data that indicates network conditions. In other examples, the network conditions may be estimated by one or more components of the core network. For example, the base station 102 may estimate network conditions for the UE 106 based on data received/transmitted to the UE 106.

At 504, a determination is made as to whether to switch to a different PCell. As discussed above, the switch may be from a higher bandwidth cell 118 to a lower bandwidth cell 118, or from a lower bandwidth cell 118 to a higher bandwidth cell 118. When the network conditions indicate to switch the PCell used by the UE 106, the process moves to 506 where the PCell is switched. When it determined that a switch of the PCell is not to occur, the process 500 returns to 502.

Although the subject matter has been described in language specific to structural features and/or methodological acts, it is to be understood that the subject matter described in this disclosure is not necessarily limited to any of the specific features or acts described. Rather, the specific features and acts are disclosed as examples and embodiments of the present disclosure.

What is claimed is:

1. A system comprising:
one or more processors;
a memory; and
one or more components stored in the memory and executable by the one or more processors to perform operations comprising:
identifying a cell, from a plurality of cells that includes a first cell associated with a first bandwidth and a second cell associated with a second bandwidth, to use as a primary cell (PCell) for carrier aggregation (CA) in a fifth generation (5G) network;
using the cell as the PCell for a user equipment (UE);
generating predicted network conditions by predicting network conditions of the 5G network;
determining whether to switch the PCell to a different one of the plurality of cells based, at least in part, on the predicted network conditions of the 5G network; and
switching the PCell to the different one of the plurality of cells.

2. The system of claim 1, wherein predicting the network conditions of the 5G network includes:
accessing measurement data for the first cell and the second cell.

3. The system of claim 2, wherein the operations further comprise receiving from the UE at least a portion of the measurement data.

4. The system of claim 1, wherein determining whether to switch the PCell to the different one of the plurality of cells is further based, at least in part on, an amount of data forecasted to upload by the UE.

5. The system of claim 1, wherein the operations further comprise establishing a communication between the first cell and the second cell, and wherein determining whether to switch the PCell to the different one of the plurality of cells is further based, at least in part on the communication between the first cell and the second cell.

6. The system of claim 1, further comprising:
determining that the UE is moving toward an edge of a coverage area,
wherein determining whether to switch the PCell to the different one of the plurality of cells is further based, at least in part on the determining that the UE is moving toward the edge of the coverage area.

7. The system of claim 1, wherein the operations further comprise:
determining a first congestion level of the first cell; and
determining a second congestion level of the second cell,
wherein determining whether to switch the PCell to the different one of the plurality of cells is further based, at least in part on at least one or more of the first congestion level and the second congestion level.

8. A computer-implemented method performed by one or more processors configured with specific instructions, the computer-implemented method comprising:
establishing a communication session within a cellular network that includes a user equipment (UE) that supports carrier aggregation (CA) in a fifth generation (5G) network;
identifying a cell, from a plurality of cells that includes a first cell associated with a first bandwidth and a second cell associated with a second bandwidth, to use as a primary cell (PCell) for the CA in the 5G network;
using the cell as the PCell for the UE;
generating predicted network conditions by predicting network conditions of the 5G network;
determining whether to switch the PCell to a different one of the plurality of cells based, at least in part, on the predicted network conditions; and
switching the PCell to the different one of the plurality of cells.

9. The computer-implemented method of claim 8, wherein predicting network conditions of the 5G network includes:
accessing measurement data for the first cell and the second cell.

10. The computer-implemented method of claim 9, further comprising receiving from the UE at least a portion of the measurement data.

11. The computer-implemented method of claim 8, wherein determining whether to switch the PCell to the different one of the plurality of cells is further based, at least in part on, an amount of data forecasted to downloaded by the UE.

12. The computer-implemented method of claim 8, further comprising establishing a communication between the first cell and the second cell, and wherein determining whether to switch the PCell to the different one of the plurality of cells is further based, at least in part on the communication between the first cell and the second cell.

13. The computer-implemented method of claim 8, further comprising:
determining that the UE is moving toward an edge of a coverage area,
wherein determining whether to switch the PCell to the different one of the plurality of cells is further based, at least in part on the determining that the UE is moving toward the edge of the coverage area.

14. The computer-implemented method of claim 8, further comprising:
determining a first congestion level of the first cell; and
determining a second congestion level of the second cell,
wherein determining whether to switch the PCell to the different one of the plurality of cells is further based, at least in part on at least one or more of the first congestion level and the second congestion level.

15. A non-transitory computer-readable media storing computer-executable instructions that, when executed, cause one or more processors of a computing device to perform acts comprising:
establishing a communication session within a cellular network that includes a user equipment (UE) that supports carrier aggregation (CA) in a fifth generation (5G) network;
identifying a cell, from a plurality of cells that includes a first cell associated with a first bandwidth and a second cell associated with a second bandwidth, to use as a primary cell (PCell) for the CA in the 5G network;
using the cell as the PCell for the UE;
generating predicted network conditions by predicting network conditions of the 5G network;
determining whether to switch the PCell to a different one of the plurality of cells based, at least in part, on the predicted network conditions; and
switching the PCell to the different one of the plurality of cells.

16. The non-transitory computer-readable media of claim 15, wherein predicting the network conditions of the 5G network includes:
   accessing measurement data for the first cell and the second cell.

17. The non-transitory computer-readable media of claim 16, wherein the acts further comprise receiving from the UE at least a portion of the measurement data.

18. The non-transitory computer-readable media of claim 15, wherein determining whether to switch the PCell to the different one of the plurality of cells is further based, at least in part on, an amount of data forecasted to upload by the UE.

19. The non-transitory computer-readable media of claim 15, wherein the acts further comprise establishing a communication between the first cell and the second cell, and wherein determining whether to switch the PCell to the different one of the plurality of cells is further based, at least in part on the communication between the first cell and the second cell.

20. The non-transitory computer-readable media of claim 15, wherein the acts further comprise:
   determining a first congestion level of the first cell; and
   determining a second congestion level of the second cell,
   wherein determining whether to switch the PCell to the different one of the plurality of cells is further based, at least in part on at least one or more of the first congestion level and the second congestion level.

\* \* \* \* \*